(12) United States Patent
Miller

(10) Patent No.: US 12,005,824 B2
(45) Date of Patent: *Jun. 11, 2024

(54) TRI-FOLD LIFTGATE

(71) Applicant: ANTHONY LIFTGATES, INC., Pontiac, IL (US)

(72) Inventor: Ronald C. Miller, Roanoke, VA (US)

(73) Assignee: ANTHONY LIFTGATES, INC., Pontiac, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,249

(22) Filed: Oct. 27, 2022

(65) Prior Publication Data
US 2023/0078027 A1    Mar. 16, 2023

Related U.S. Application Data

(63) Continuation of application No. 17/410,058, filed on Aug. 24, 2021, now Pat. No. 11,498,471.

(60) Provisional application No. 63/069,510, filed on Aug. 24, 2020.

(51) Int. Cl.
 *B60P 1/44* (2006.01)

(52) U.S. Cl.
 CPC ............ *B60P 1/4414* (2013.01); *B60P 1/445* (2013.01); *B60P 1/4492* (2013.01); *B60P 1/4485* (2013.01)

(58) Field of Classification Search
 CPC ......... B60P 1/022; B60P 1/4414; B60P 1/445; B60P 1/4492; A61G 3/062
 USPC ........................................................ 414/458
 See application file for complete search history.

(56) References Cited

U.S. PATENT DOCUMENTS

| | | |
|---|---|---|
| 2,459,045 A | 1/1949 | Pride |
| 3,734,239 A | 5/1973 | Martin et al. |
| 3,795,329 A | 3/1974 | Martin et al. |
| 3,800,915 A | 4/1974 | Himes |
| 4,087,007 A | 5/1978 | Drews |
| 4,273,217 A | 6/1981 | Kajita |
| 5,263,808 A | 11/1993 | Kent |
| 5,449,267 A | 9/1995 | Ablabutyan |
| 5,513,943 A | 5/1996 | Lu |

(Continued)

FOREIGN PATENT DOCUMENTS

| | | |
|---|---|---|
| CN | 110254331 | 9/2019 |
| GB | 2106857 | 4/1983 |

(Continued)

*Primary Examiner* — James Keenan
(74) *Attorney, Agent, or Firm* — Barnes & Thornburg LLP; Mark J. Nahnsen

(57) ABSTRACT

A liftgate in accordance with the present disclosure includes a lift mechanism and a moveable load platform. The load platform includes a proximal deck section, a distal deck section, and a center deck section positioned between the proximal deck section and the distal deck section. The load platform is selectively vertically movable between a lowered position and a raised position. The proximal deck section, center deck section, and distal deck section are pivotally coupled to one another such that the load platform is selectively moveable between an extended-operational position, wherein all of the deck sections are located substantially coplanar with one another for supporting cargo, and a retracted-stored position wherein the deck sections are folded with respect to one another and are located substantially parallel and adjacent to one another.

19 Claims, 15 Drawing Sheets

(56) References Cited

U.S. PATENT DOCUMENTS

| | | |
|---|---|---|
| 5,672,041 A | 9/1997 | Ringdahl et al. |
| 6,379,102 B1 | 4/2002 | Kameda |
| 7,491,026 B2 | 2/2009 | Hooker |
| 8,282,335 B2 | 10/2012 | Bark |
| 8,740,539 B2 | 6/2014 | Ablabutyan |
| 9,481,282 B2 | 11/2016 | Walker |
| 10,220,759 B2 | 3/2019 | Ablabutyan |
| 10,710,488 B2 | 7/2020 | Hambardzumyan |
| 2003/0057243 A1 | 3/2003 | Himel |
| 2008/0063499 A1 | 3/2008 | Niinisto |
| 2008/0143280 A1 | 6/2008 | Rock |
| 2010/0313479 A1 | 12/2010 | Bark |
| 2012/0121369 A1 | 5/2012 | Ablabutyan |
| 2013/0136566 A1 | 5/2013 | Baechler |
| 2015/0122965 A1 | 5/2015 | Arzouman |
| 2015/0232309 A1 | 8/2015 | Jaipaul |
| 2016/0075270 A1 | 3/2016 | Walker |
| 2016/0272102 A1 | 9/2016 | Hambardzumyan |
| 2017/0340493 A1 | 11/2017 | Sidhu |
| 2018/0236923 A1 | 8/2018 | Wu |
| 2021/0039543 A1 | 2/2021 | Walker |

FOREIGN PATENT DOCUMENTS

| | | | | |
|---|---|---|---|---|
| GB | 2190649 A | * | 11/1987 | ............. B60P 1/445 |
| GB | 2324515 | | 10/1998 | |
| JP | 2014-46852 | | 3/2014 | |

* cited by examiner

TRI-FOLD LIFTGATE

PRIORITY CLAIM

This application is a Continuation application of U.S. patent application Ser. No. 17/410,058, filed Aug. 24, 2021, now U.S. Pat. No. 11,498,471, entitled Tri-fold Tuck Under Liftgate, which claims priority under 35 U.S.C. § 119(e) to U.S. Provisional Application Ser. No. 63/069,510, filed Aug. 24, 2020, which are both expressly incorporated herein by reference in their entirety.

INCORPORATION BY REFERENCE

U.S. patent application Ser. No. 16/988,444 and U.S. Provisional Application 62/884,992 are both hereby incorporated by reference in their entirety to the same extent as if each individual publication, patent or patent application was specifically and individually indicated to be incorporated by reference in its entirety.

BACKGROUND

The present disclosure is directed to a liftgate having a tri-fold load platform that is selectively moveable between a lowered position and a raised position, such that cargo can be loaded onto or unloaded from the load platform.

Liftgates are used in connection with vehicles such as trucks and trailers to facilitate the loading and unloading of cargo from the vehicle when the cargo needs to be moved vertically between a loading surface, such as a ground surface or a dock surface, and the surface of the vehicle cargo floor. The liftgate is typically mounted to the rear end of a truck or trailer to facilitate loading and unloading of the truck or trailer. The dimensions of the cargo support surface of the load platform often limits the size of the cargo that can be handled by the load platform. The dimensions of the load platform are often limited by the ability to move the load platform to a retracted-stored position without interfering with access to the cargo section of the vehicle.

SUMMARY

A liftgate in accordance with the present disclosure includes a lift mechanism and a moveable load platform. The load platform includes a proximal deck section, a distal deck section, and a center deck section positioned between the proximal deck section and the distal deck section. The load platform is selectively vertically movable between a lowered position and a raised position. The proximal deck section, center deck section, and distal deck section are pivotally coupled to one another such that the load platform is selectively moveable between an extended-operational position, wherein all of the deck sections are located substantially coplanar with one another for supporting cargo, and a retracted-stored position wherein the deck sections are folded with respect to one another and are located substantially parallel and adjacent to one another. When the load platform is in the extended-operational position, the distal deck section extends outwardly from a distal end of the center deck section such that the distal deck section forms part of a load-bearing portion of the load platform to support a load during movement between the lowered and raised positions without the need for any external support from a support structure such as a ground surface or loading dock.

In illustrative embodiments, when the load platform is in the extended-operational position, the distal deck section is cantilevered outwardly from a distal end of the center deck section such that the distal deck section of the load platform is self-supporting without the need for any external support.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION

Figure 1:
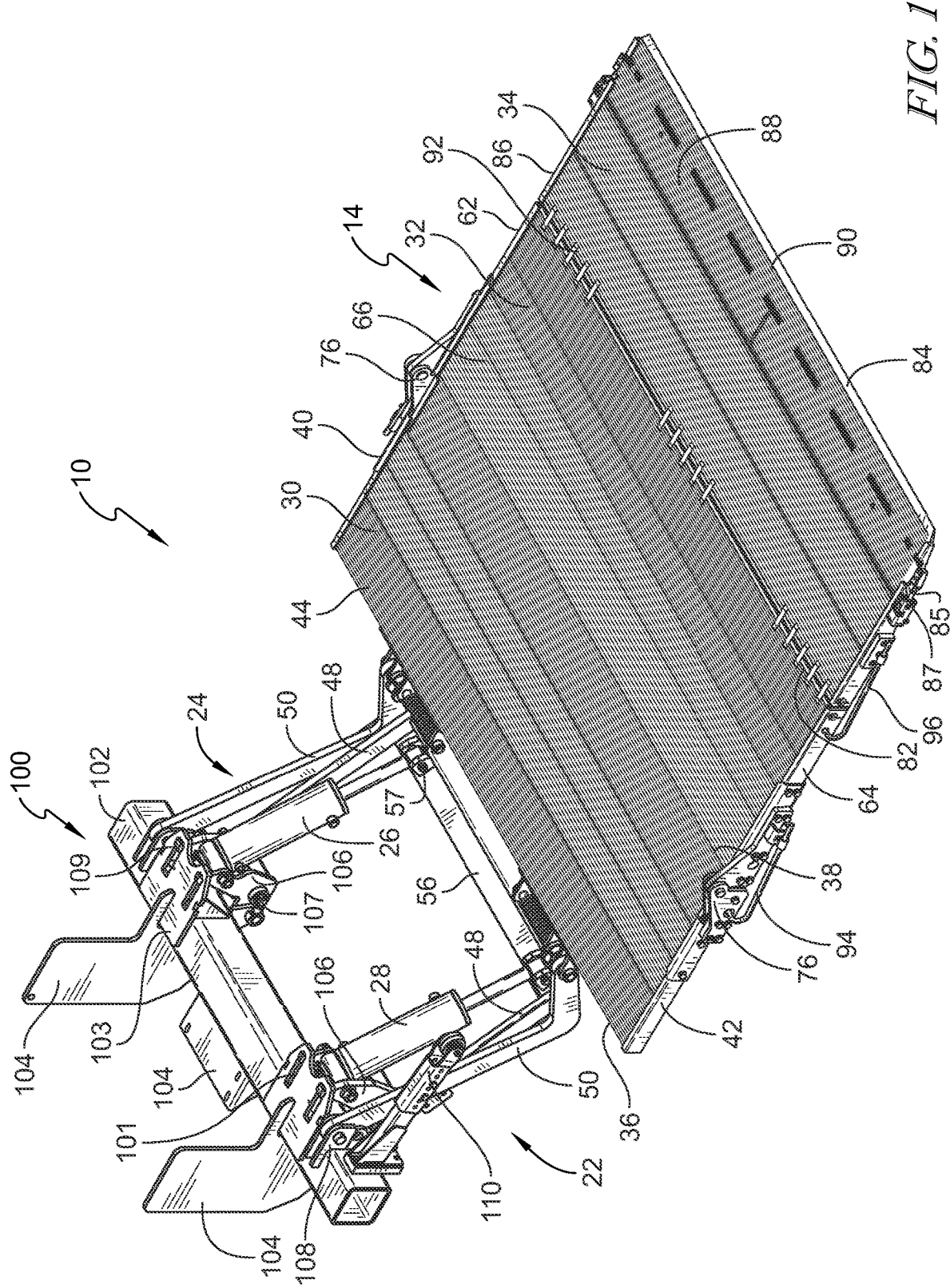
FIG. 1 is an upper perspective view of an exemplary embodiment of a liftgate in accordance with the present disclosure shown for mounting to the rear end of a vehicle with a platform in an extended-operational orientation and in a lowered position.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Figure 6:
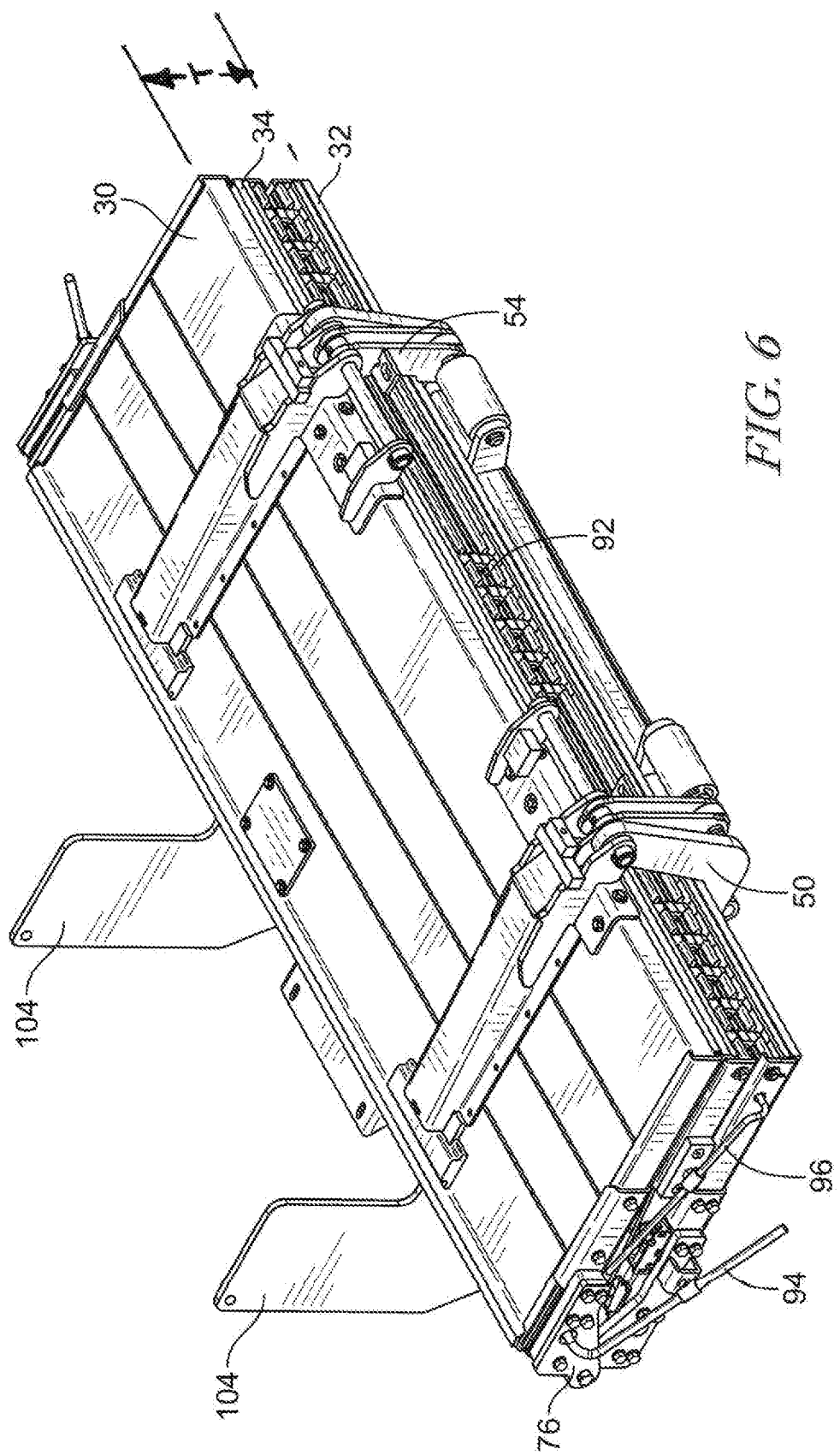
FIG. 6 is an upper perspective view of the liftgate of FIG. 5 shown with the folded load platform further pivoted to a substantially horizontal orientation in a retracted-stored position.
Figure 7:
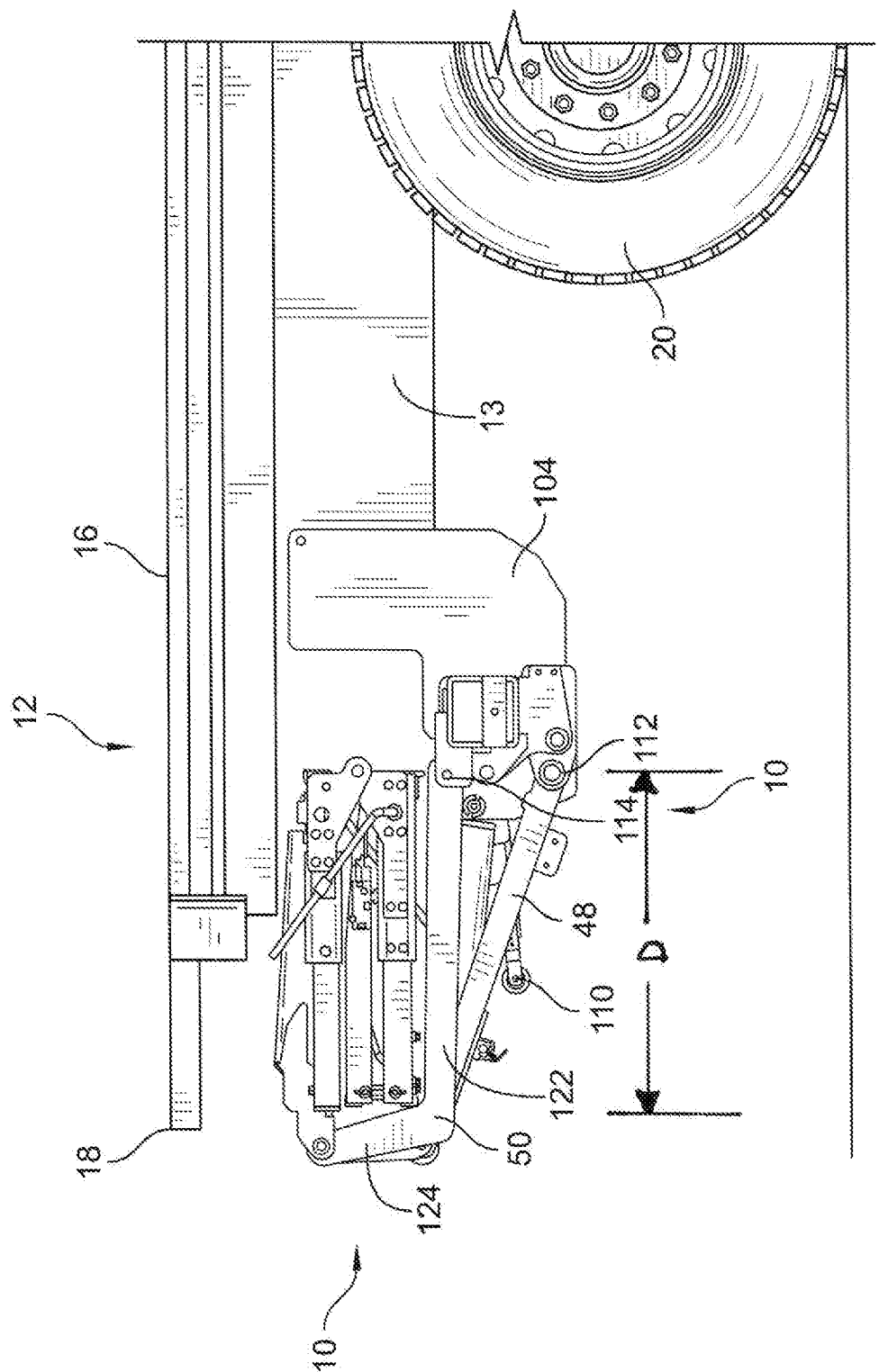
FIG. 7 is a side elevational view of the liftgate of FIG. 6 mounted to a frame of a truck and showing the folded load platform in the retracted-stored position beneath the floor of the truck bed.
Figure 9:
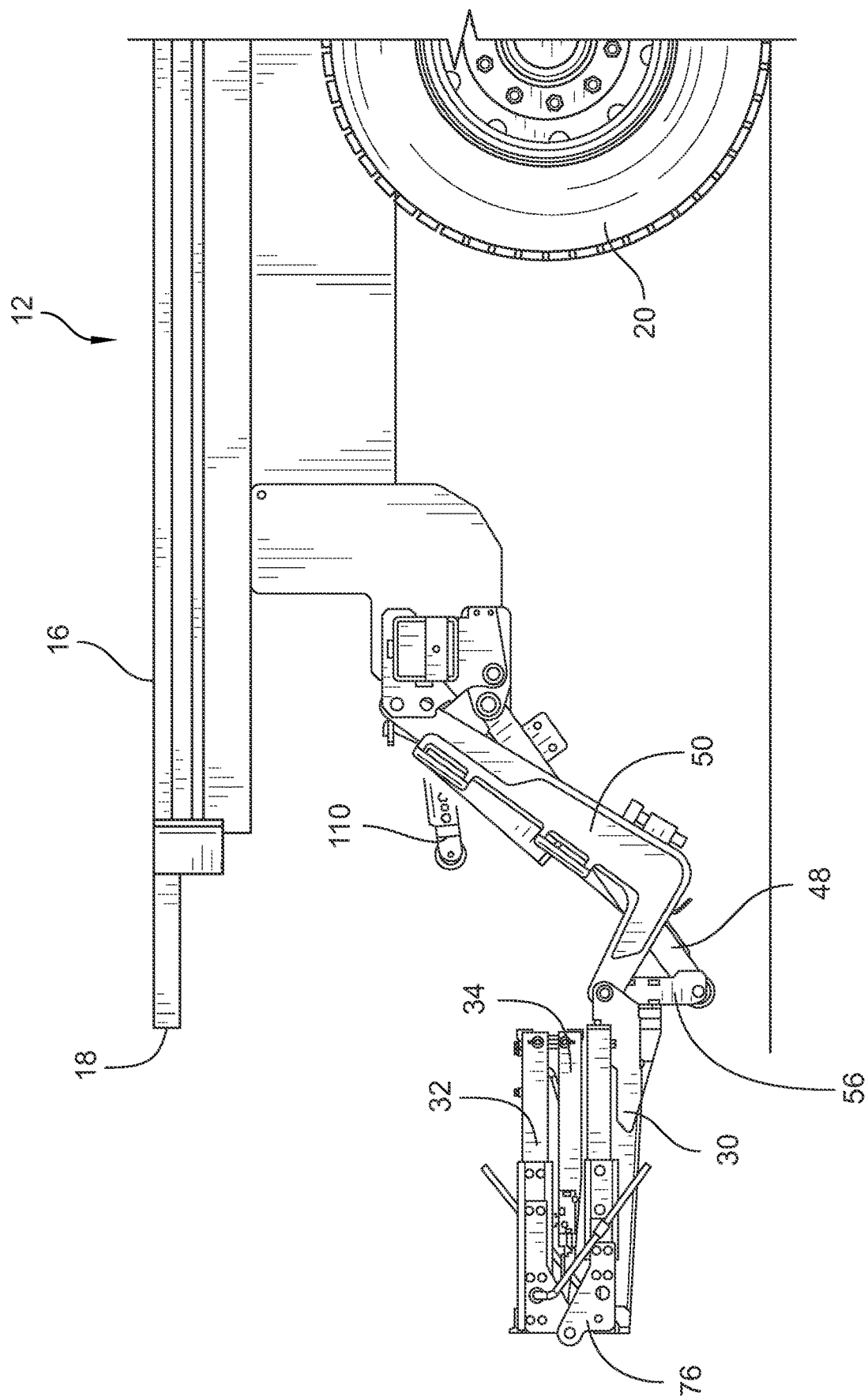
FIG. 9 is a side elevational view of the liftgate of FIG. 4 mounted to a frame of a truck and showing the folded load platform pivoted to a substantially horizontal orientation as the liftgate continues to move from the retracted-stored position to the unfolded extended-operational position.
Figure 10:
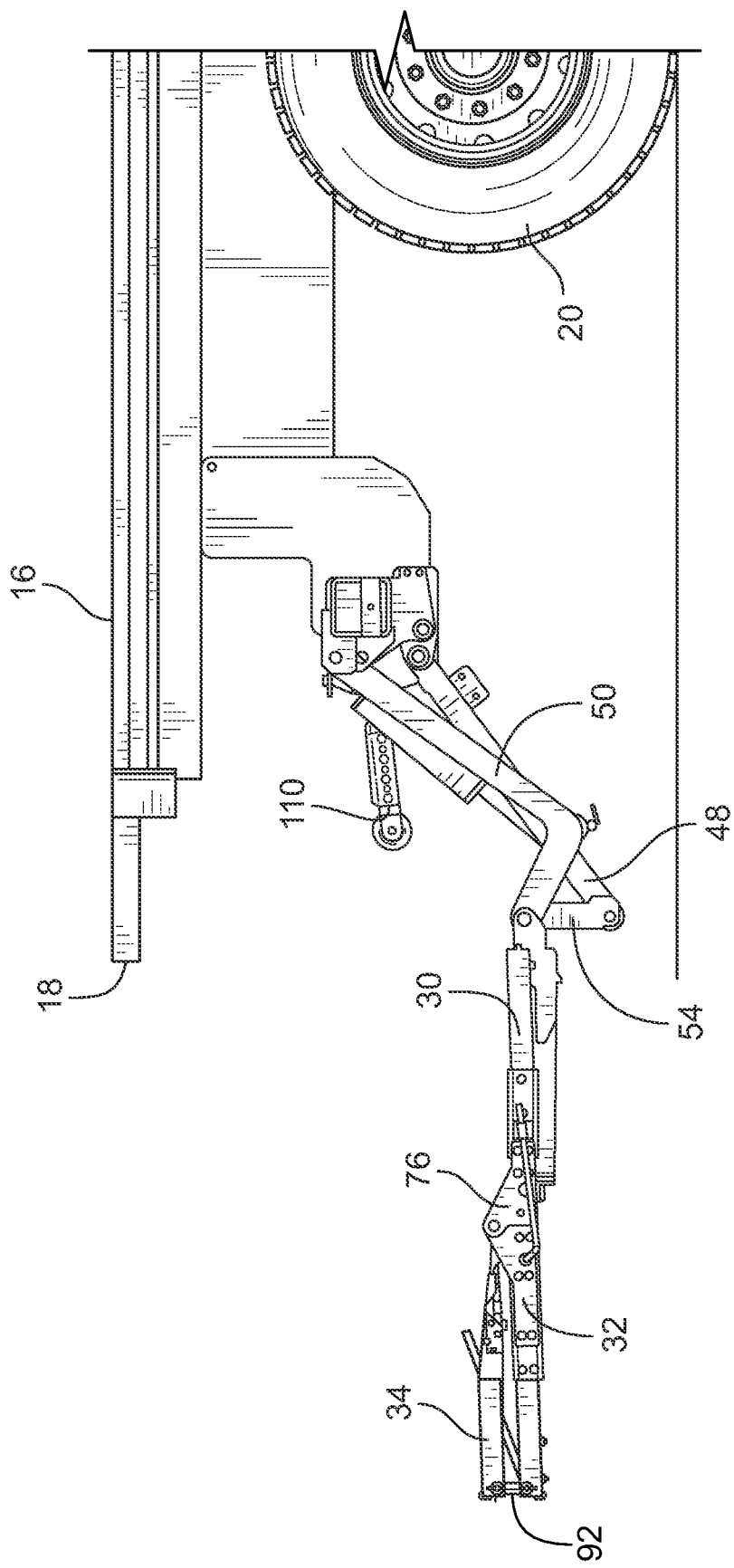
FIG. 10 is a side elevational view of the liftgate of FIG. 3 mounted to a frame of a truck and showing the load platform partially unfolded with the proximal and central deck sections unfolded and the distal deck section still in the folded positioned on the center deck section.
Figure 11:
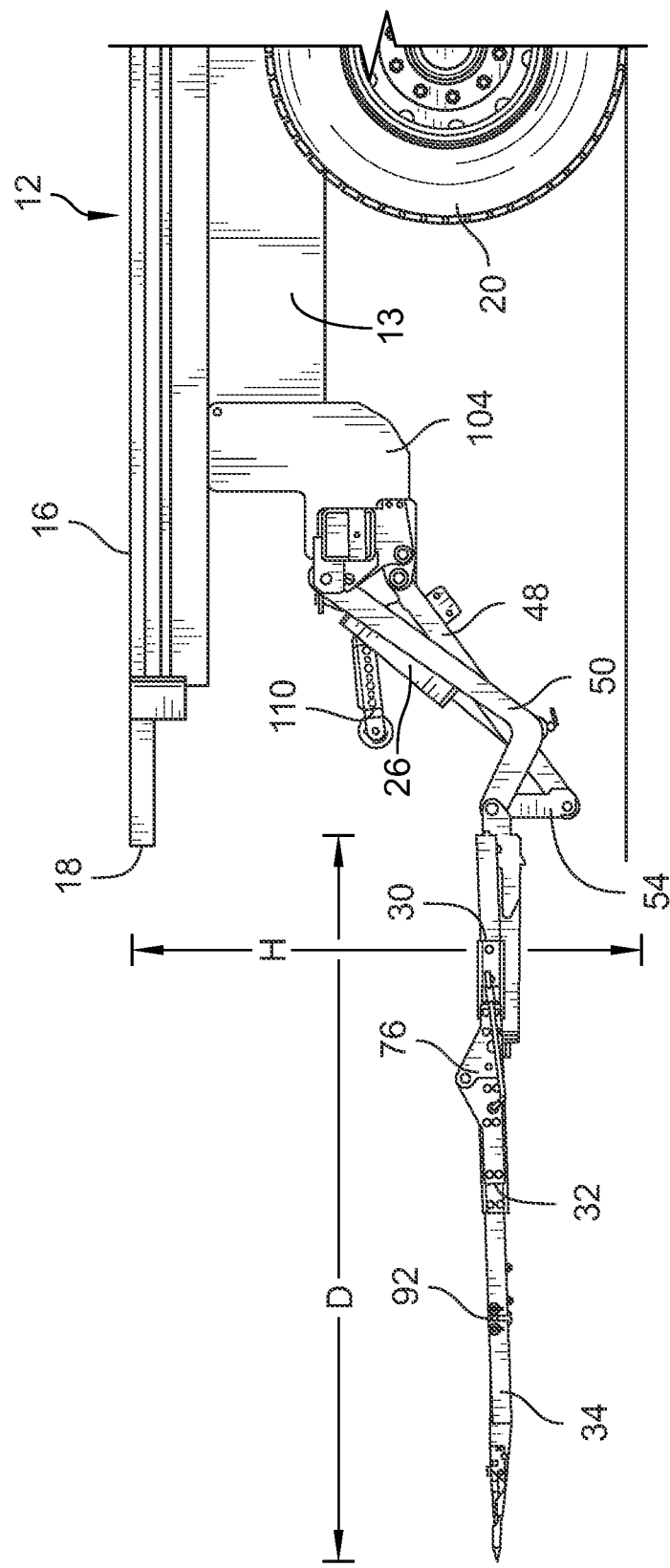
FIG. 11 is a side elevational view of the liftgate of FIG. 1 mounted to a frame of a truck and showing the load platform fully unfolded into the extended-operational position with the load platform in a lowered position.

The present disclosure is directed to a liftgate 10 for a vehicle 12 as shown in FIGS. 1 and 11. A load platform 14 of the liftgate 10 is selectively moveable between a lowered position and a raised position by a lift mechanism 22 for unloading cargo from the vehicle 12 onto the load platform 14 and for loading cargo from the load platform 14 onto the vehicle 12 as shown in FIGS. 1, 2, 11, and 12. Liftgate 10 is adapted to be mounted to the rear or aft end of vehicle 12, as shown in FIGS. 7-12. Vehicle 12 may comprise a truck, trailer or other cargo conveying apparatus. Load platform 14 includes a proximal deck section 30, a center deck section 32, and a distal deck section 34 that are pivotable relative to one another and relative to lift mechanism 22 between an extended-operational position (FIGS. 1 and 11) and a retracted-stored position (FIGS. 6 and 7). Deck sections 30, 32, 34 are foldable relative to one another to move load platform 14 between the extended-operational and retracted-stored positions as shown in FIGS. 1-12.

Vehicle 12 includes a substantially planar and horizontal cargo floor or bed 16 having a substantially linear rear edge 18, as shown, for example, in FIG. 7. Vehicle 12 includes wheels 20 rotatably mounted to vehicle 12 for rotation about one or more rotational axes. Rear edge 18 of cargo floor 16 and rotational axes of wheels 20 are substantially parallel to one another. Vehicle 12 includes a transverse axis that is substantially parallel to rear edge 18 of cargo floor 16 and the rotational axes of wheels 20, and a longitudinal axis that extends from the aft end to the front end of vehicle 12 substantially perpendicular to the transverse axis and to rear edge 18 of cargo floor 16 and the rotational axes of wheels 20. The top surface of cargo floor 16 of vehicle 12 is typically located at a vertical height (H) above a loading surface, as shown, for example in FIG. 11. The loading surface may comprise the surface of the ground, road, parking lot or the like on which wheels 20 of vehicle 12 are supported or the surface of a loading dock, sidewalk or the like which may be located at a vertical height above the surface on which the wheels 20 are supported.

Figure 12:
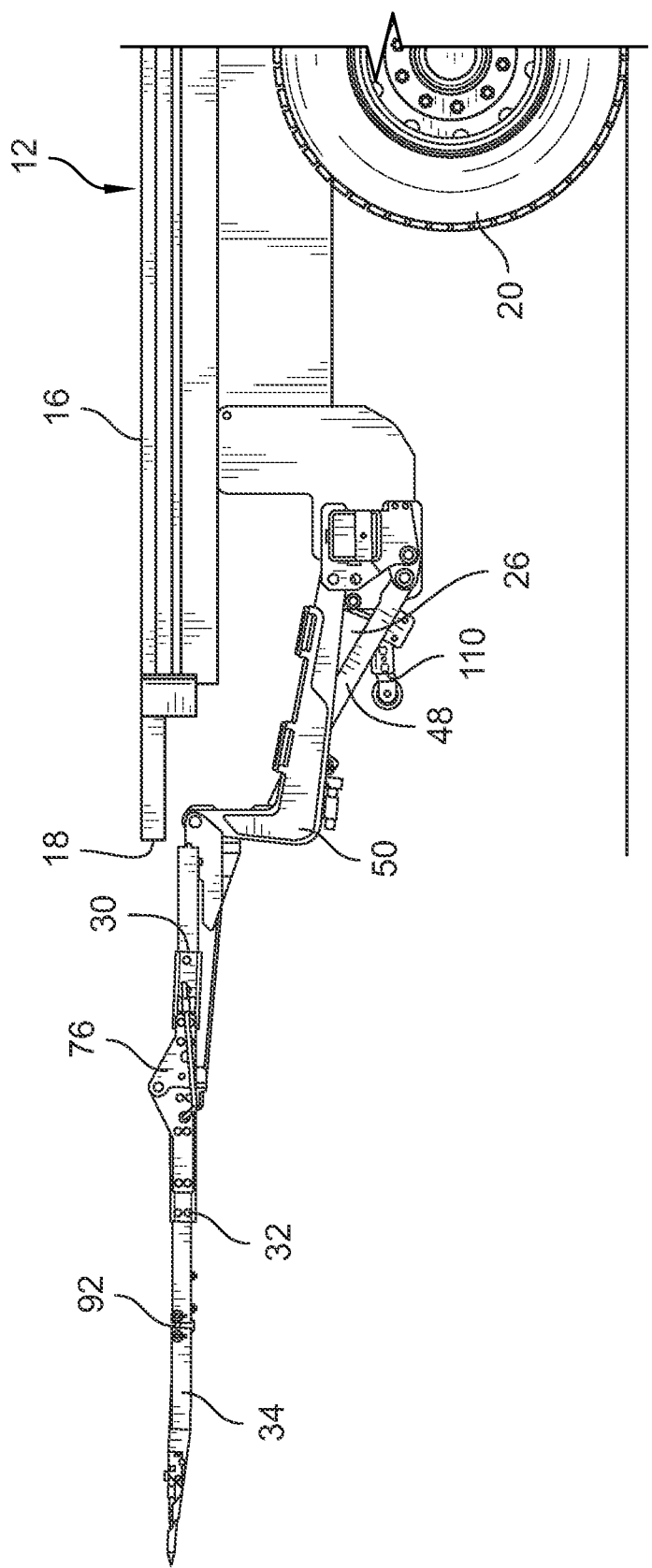
FIG. 12 is a side elevational view of the liftgate of FIG. 2 mounted to a frame of a truck and showing the load platform fully unfolded into the extended-operational position with the load platform in a raised position.

In the illustrative embodiment, liftgate 10 includes the load platform 14 coupled to the lift mechanism 22 for movement between the extended-operational and retracted-stored positions and the raised and lowered positions as shown in FIGS. 1-6. Lift mechanism 22 includes lift linkage 24 and actuators 26, 28 that are used to control movement of the liftgate 10. First and second actuators 26, 28 can be in the form of hydraulic cylinders. Actuators 26, 28 are used to raise and lower load platform 14 from a lowered position, as shown in FIG. 11, to an elevated position, as shown in FIG. 12. Load platform 14 can be lowered all the way so that distal edge 84 of load platform 14 is flush with the ground. Load platform 14 can also be raised all the way so that proximal edge 36 is positioned adjacent or abutting rear edge 18 of cargo floor 16. Actuators 26, 28 are also used to move the load platform 14 from a retracted-stored position, as shown in FIG. 7, to an extended-operational position, as shown in FIG. 9. The benefit of the illustrated liftgate 10 is that a larger load platform 14, which can hold larger cargo, such as a sofa or hot tub, can still be folded and positioned beneath the cargo floor 16 of the vehicle 12.

Figure 13:
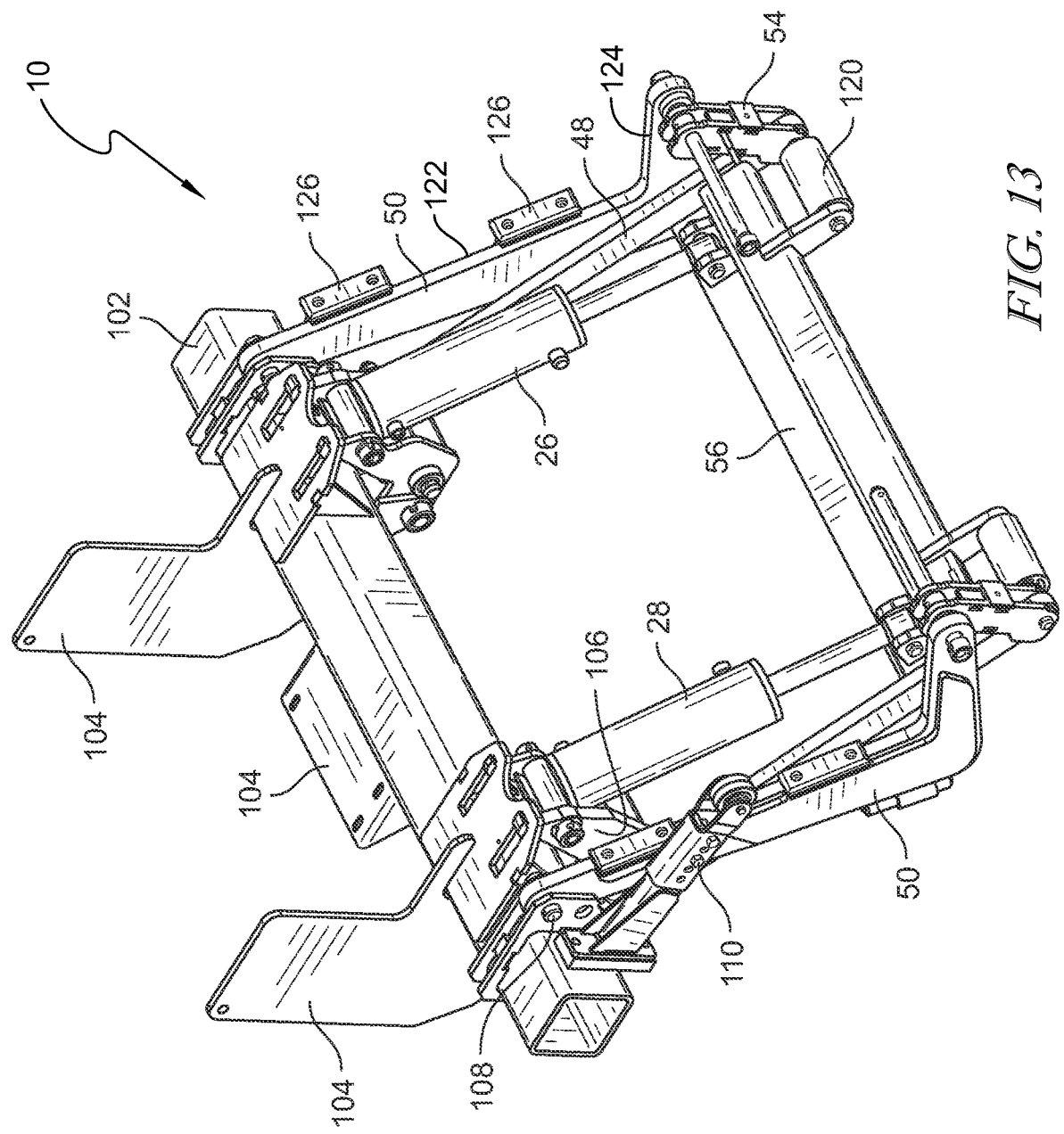
FIG. 13 is an upper perspective view of a lift mechanism of the liftgate of FIG. 1 with the lift mechanism in the lowered position.
Figure 14:
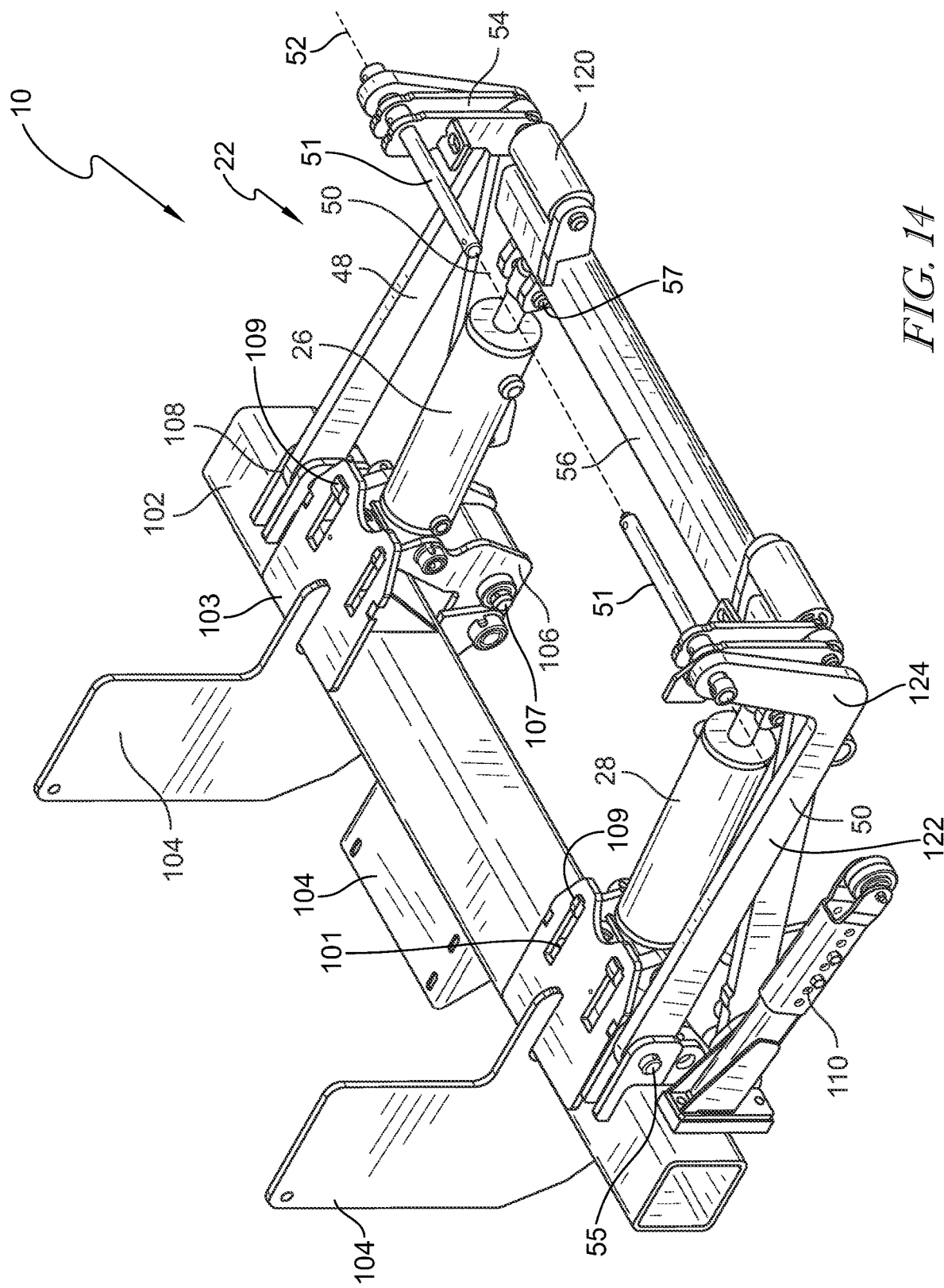
FIG. 14 is an upper perspective view of the lift mechanism of FIG. 13 with the lift mechanism in the raised position.
Figure 15:
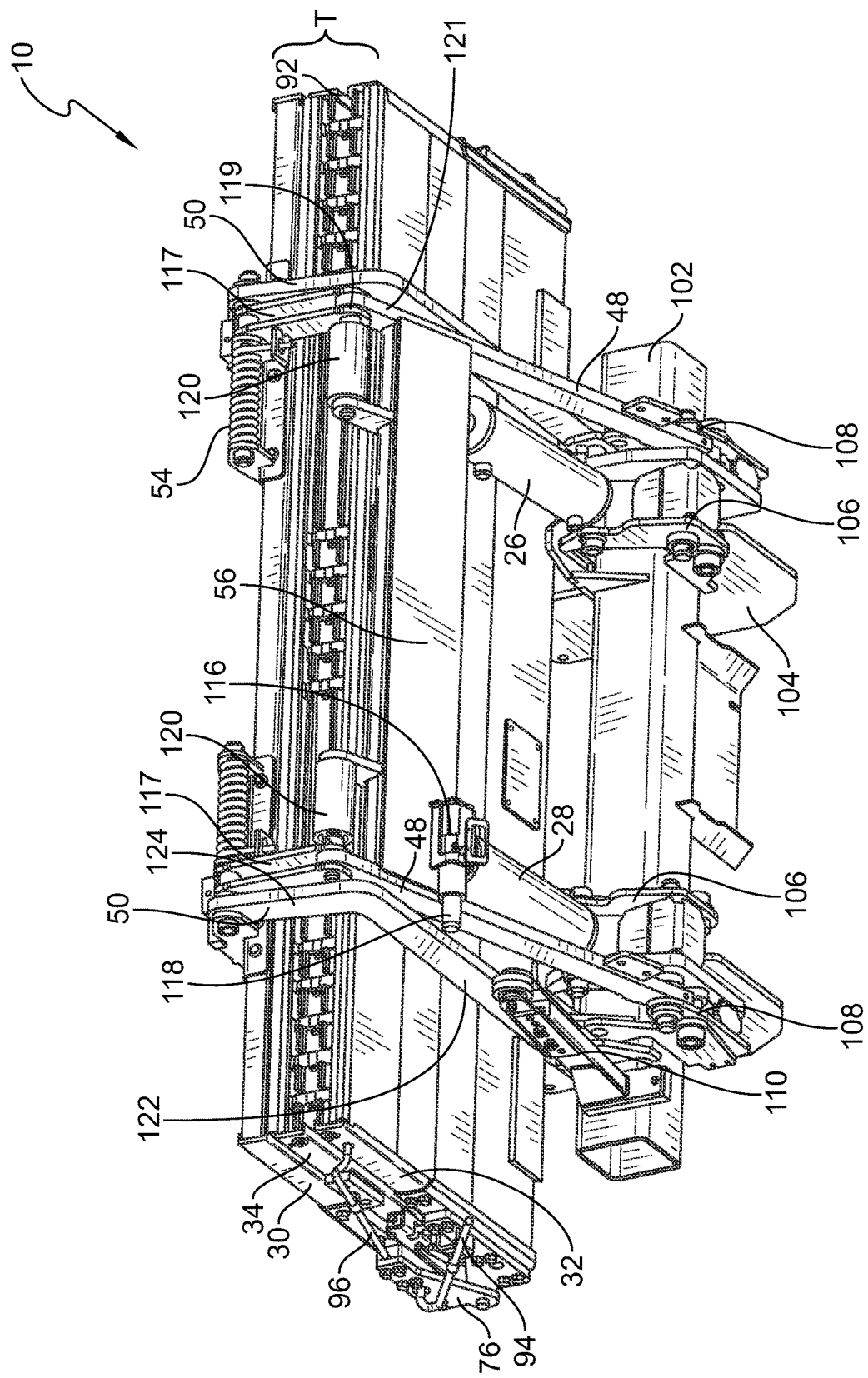
FIG. 15 is a lower perspective view of the liftgate of FIG. 6 with the lift platform in the retracted-stored position.

Inner and outer control arms 48, 50 of the lift linkage 24 are used to control the movement of the load platform 14 during operation of the actuators 26, 28. Inner and outer control arms 48, 50 also control movement of load platform 14 from the retracted-stored position to the extended-operational position. Outer control arms 50 includes a first leg 122 and a second leg 124, as shown in FIGS. 7 and 14. First leg 122 is longer than second leg 124 of outer control arm 50. In some embodiments, second leg 124 may include pads 126 that engage the load platform 14 when in the retracted-stored position, as shown in FIG. 13. A length of first leg 122 spans a depth (D) of the load platform 14 when the platform is folded, as shown in FIGS. 7 and 15. Second leg 124 has a length that is long enough to accommodate the thickness (T) of the three deck sections when the deck sections are in the folded position, as shown in FIG. 6.

Figure 8:
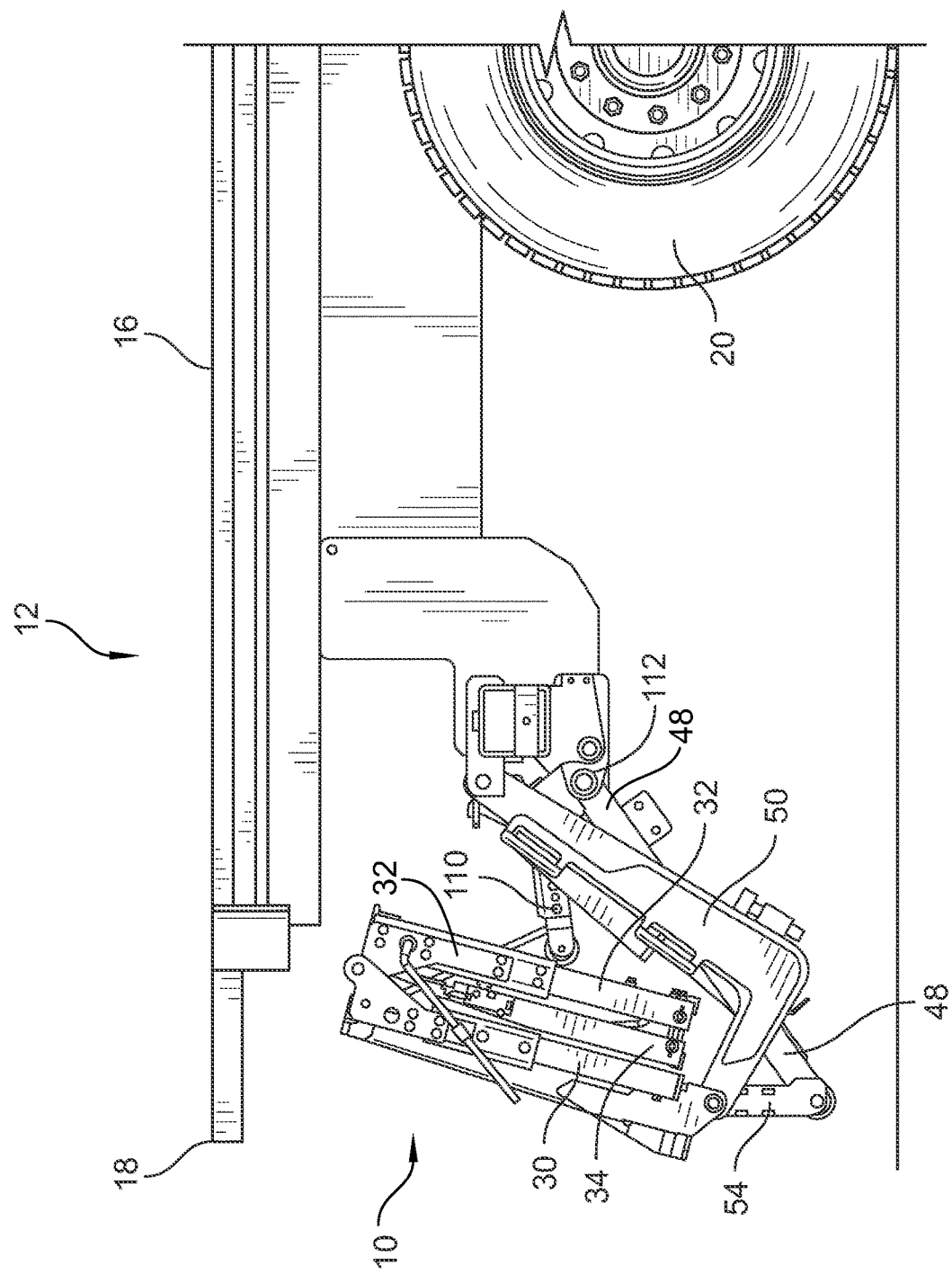
FIG. 8 is a side elevational view of the liftgate of FIG. 5 mounted to a frame of a truck and showing the folded load platform pivoted to a generally vertical orientation as the liftgate starts to move from the retracted-stored position to the unfolded extended-operational position.

Outer control arms 50 of lift mechanism 22 include pins 51 that pivotally connect outer control arms 50 to inner control arms 48 (through pivot link members 54) and to proximal deck section 30 to form an axis of rotation 52, as shown in FIG. 14. Outer control arms 50, inner control arms 48 and proximal deck section 30 pivot relative to axis 52. Lift mechanism also includes springs 59 positioned around pins 51. Springs 59 assist in rotation of load platform 14 from the generally horizontal position shown in FIG. 4 to the generally vertical position shown in FIG. 5. Outer control arms 50 are pivotally coupled to mounting tube 102 by use of pins 55, and inner control arms 48 are pivotally coupled to mounting tube 102 by use of pins 112 (FIGS. 7 and 8).

Figure 2:
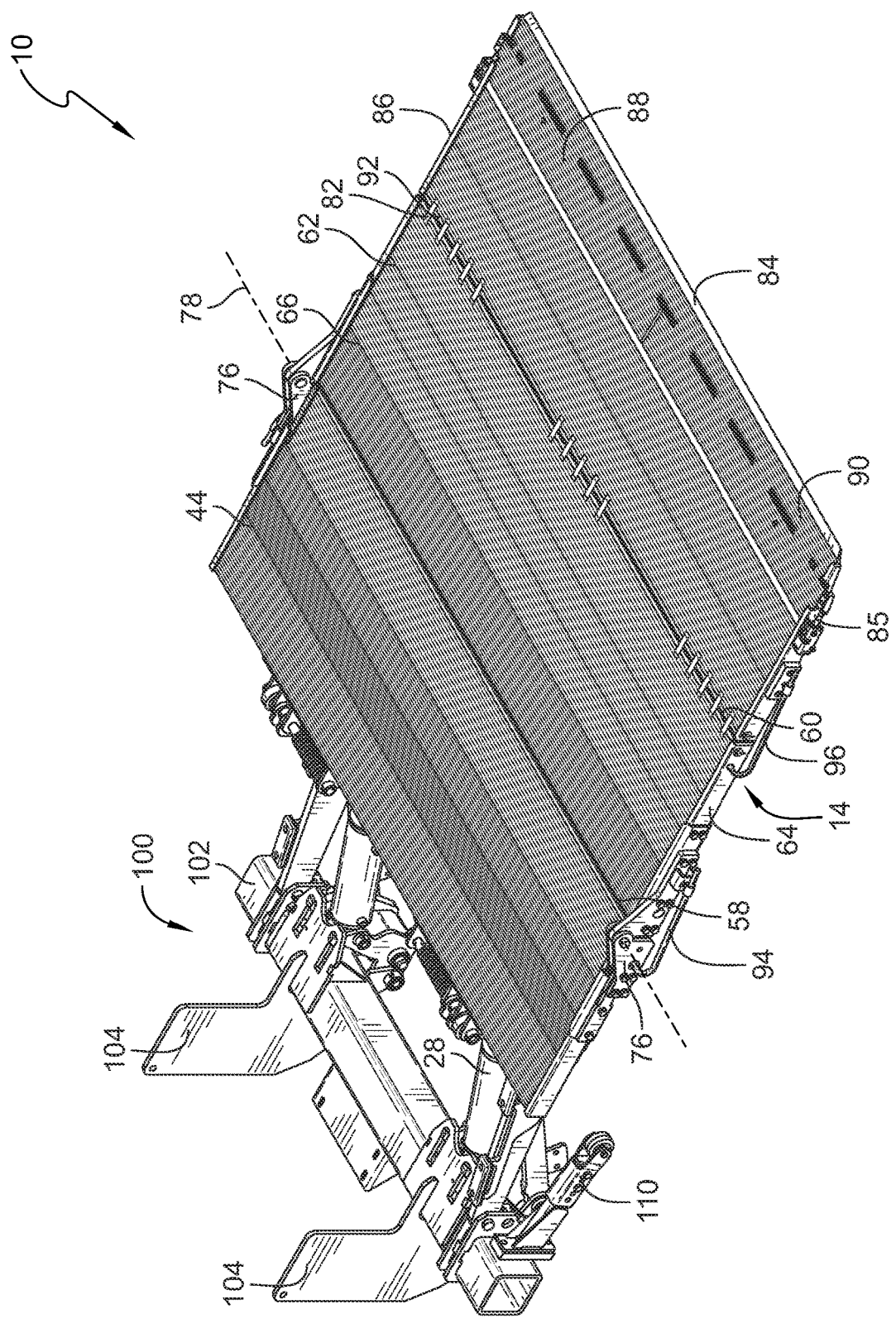
FIG. 2 is an upper perspective view of the liftgate of FIG. 1 shown with the load platform in the extended-operational orientation and in a raised position.

Liftgate 10 includes the selectively moveable and foldable load platform 14 pivotally coupled to lift mechanism 22, as shown in FIGS. 1 and 2. Load platform 14 includes a proximal deck section 30, a center deck section 32, and a distal deck section 34. Proximal deck section 30 is substantially rectangular and includes a substantially linear proximal edge 36 and a spaced apart and substantially parallel and linear distal edge 38. Proximal edge 36 and distal edge 38 extend substantially parallel to rear edge 18 of cargo floor 16 of vehicle 12 and the rotational axes of wheels 20.

Proximal deck section 30 also includes a substantially linear first side edge 40 and a spaced apart and substantially parallel and linear second side edge 42. First side edge 40 and second side edge 42 extend between and substantially perpendicular to proximal edge 36 and distal edge 38. Proximal deck section 30 includes a substantially planar floor 44 mounted on a base that extends between proximal edge 36, distal edge 38, first side edge 40 and second side edge 42. Floor 44 may comprise a plate, such as checkered or diamond plate, and can be made from steel or aluminum, for example. Floor 44 has a substantially planar top surface and is adapted to support cargo transferred from cargo floor 16 of vehicle 12 onto load platform 14.

Figure 4:
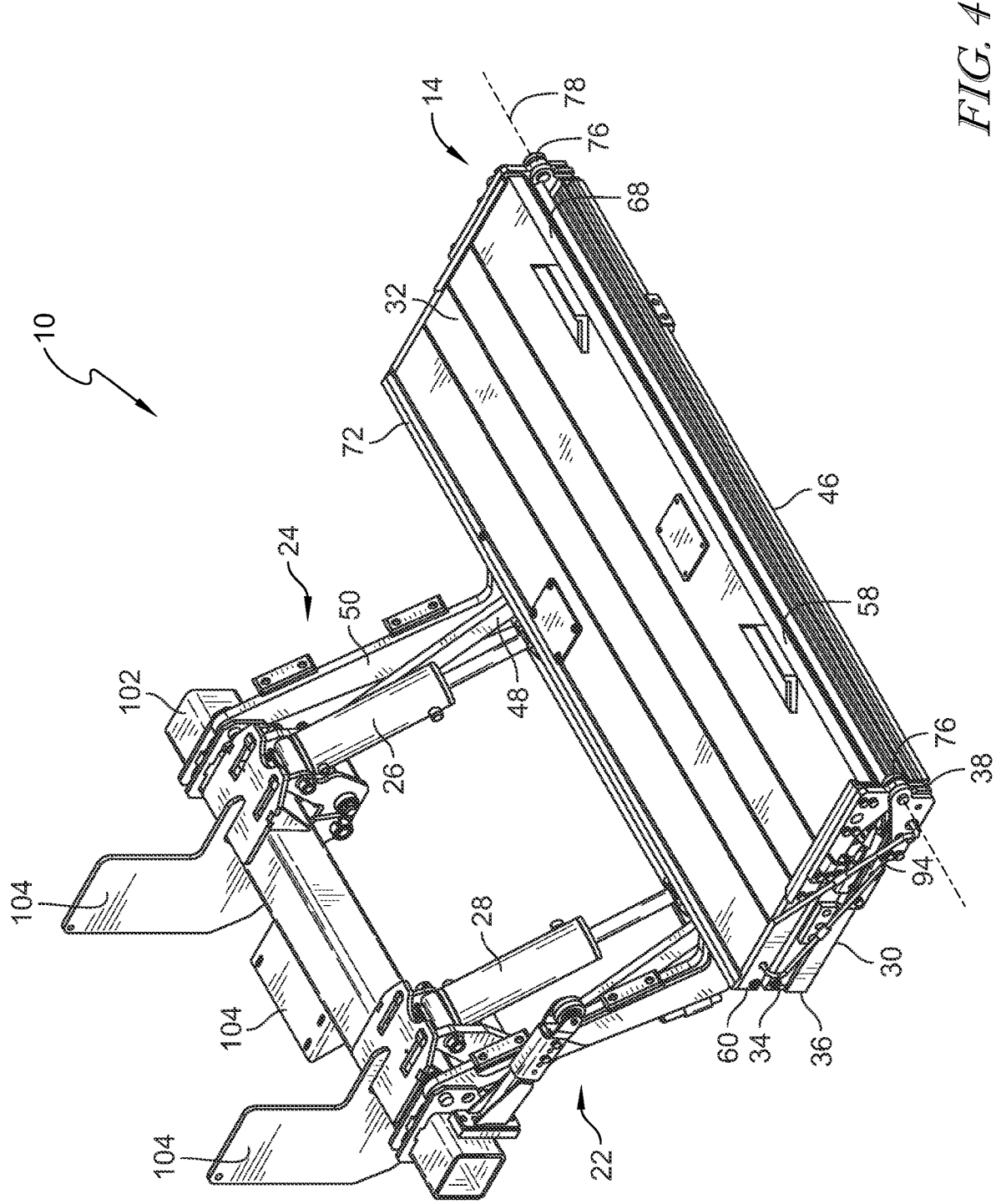
FIG. 4 is an upper perspective view of the liftgate of FIG. 3 shown with the distal and central deck sections folded onto a proximal deck section of the load platform.

Proximal deck section 30 includes a substantially planar distal end wall 46 that extends downwardly from floor 44 at distal edge 38 of proximal deck section 30 substantially perpendicular to floor 44, as shown in FIG. 4. Proximal edge 36 of proximal deck section 30 is pivotally coupled to outer control arms 50 about a first axis of rotation 52. Proximal edge 36 of proximal deck section 30 is pivotally coupled to inner control arms 48 by use of pivot link members 54. Linking bar 56 extends between inner control arms 48. Lower ends of actuators 26, 28 are pivotally coupled to the linking bar 56 by use of pins 57, as shown in FIGS. 1 and 14.

A lock 116 can be coupled to linking bar 56, as shown in FIG. 15. A lock pin 118 of lock 116 is arranged in a path of the outer control arm 50 to lock the liftgate 10 in the retracted-stored position. Lock pin 118, when in the locked position, prevents unwanted downward movement of control arms 48, 50 in the event that the actuators 26, 28 have a leak or otherwise malfunction and do not maintain position. In some embodiments, rollers 120 are coupled to linking bar 56. Rollers 120 are adapted to engage a ground surface upon moving the liftgate 10 from the retracted-stored position to the extended-operational position and back to the retracted-stored position.

Center deck section 32 of load platform 14 is substantially rectangular and includes a substantially linear proximal edge 58 and a spaced apart and substantially parallel and linear distal edge 60, as shown in FIGS. 1 and 2. Proximal edge 58 and distal edge 60 are substantially parallel to one another and to proximal edge 36 and distal edge 38 of proximal deck section 30. Center deck section 32 also includes a substantially linear first side edge 62 and a spaced apart and substantially parallel and linear second side edge 64. First side edge 62 and second side edge 64 extend substantially perpendicularly between proximal edge 58 and distal edge 60.

First side edge 62 of center deck section 32 is located substantially collinear with first side edge 40 of proximal deck section 30 when proximal deck section 30 and center deck section 32 are in their substantially horizontal extended-operational positions, as shown in FIG. 1. Second side edge 64 of center deck section 32 is located substantially collinear with second side edge 42 of proximal deck section 30 when proximal deck section 30 and center deck section 32 are in their substantially horizontal extended-operational positions. Center deck section 32 includes a substantially planar floor 66 mounted on a base. Floor 66 has a substantially planar top surface. Floor 66 may be formed from a plate, such as checkered plate, and can be made from steel or aluminum, for example.

Figure 3:
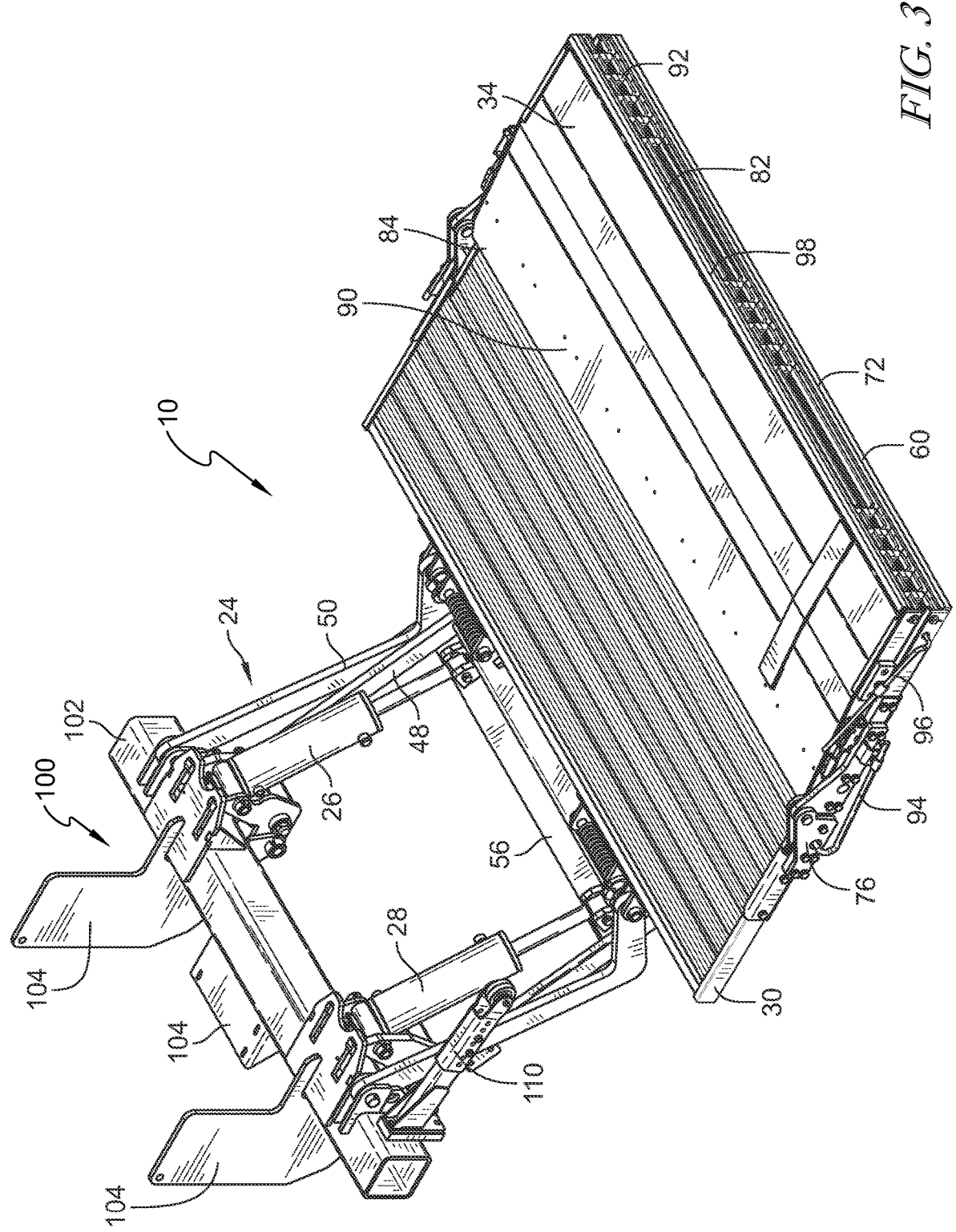
FIG. 3 is an upper perspective view of the liftgate of FIG. 1 shown with a distal deck section of the load platform folded onto a center deck section and the load platform in the lowered position.

Center deck section 32 includes a substantially planar proximal end wall 68 that extends downwardly from proximal edge 58 and perpendicular to floor 66, as shown in FIG. 4. Center deck section 32 includes a substantially planar distal end wall 72 that extends downwardly from distal edge 74 and substantially perpendicular to floor 66, as shown in FIG. 3. Proximal end wall 68 and distal end wall 72 are spaced apart from one another and are substantially parallel to one another. Proximal end wall 68 of center deck section 32 is adapted to be substantially parallel to and in abutting engagement with distal end wall 46 of proximal deck section 30 when proximal deck section 30 and center deck section 32 are in the extended-operational positon. Center deck section 32 is pivotally coupled to proximal deck section 30 by use of hinges 76, which form an axis of rotation 78, as shown in FIG. 4. Hinges 76 are designed so that distal deck section 34 can be positioned between proximal and center deck sections 30, 32 and deck sections 30, 32, 34 are generally parallel to each other when load platform 14 is folded.

This arrangement allows the center deck section 32 to be cantilevered from the proximal deck section 30 without the need for any external support structure or other support structure. This arrangement allows load forces from the center deck section 32 to be supported by the proximal deck section 30. One or more hinges 76 pivotally couple proximal edge 58 of center deck section 32 to distal edge 38 of proximal deck section 30 for pivotal movement of proximal deck section 30 and center deck section 32 with respect to one another about a substantially linear pivot axis 78, as shown in FIG. 2. Pivot axis 78 is spaced apart from and substantially parallel to rear edge 18 of cargo floor 16.

In the illustrative embodiments, pivot axis 78 is located above a plane including the top surfaces of floors 44 and 66 of proximal deck section 30 and center deck section 32 when load platform 14 is in the extended-operational position. Hinges 76 include pins to allow for pivoting of the proximal and central deck sections 30, 32 and allow load forces placed on center deck section when in the unfolded position to be transferred from center deck section 32 to proximal deck section 30. In some embodiments, the surface area of the floor 66 of center deck section 32 is approximately the same size as the floor 44 of proximal deck section 30.

Hinge 76 allows center and distal deck sections 32, 34 to be pivoted up and over onto floor 44 of proximal deck section 30 so that distal deck section 34 so that distal deck section 34 is sandwiched between proximal and center deck sections 30, 34, as illustrated in FIG. 4, for example. Biasing member(s) 94 is adapted to assist a user in folding center and distal deck sections 32, 34 onto proximal deck section 30, as shown in FIG. 4. Biasing member 94 is designed to have enough biasing force to offset the weight of both the center and distal deck sections 32, 34 to allow a user to fold both deck sections together without much effort. Biasing member 94 can be in the form of a tension rod or a bias spring to assist in folding the deck sections 32, 34 relative to proximal deck section 30. Hinge axis 78 is spaced far enough from floor 44 of proximal deck section 30 so that distal deck section 34 can be positioned between proximal and distal deck sections 30, 34 when load platform 14 is folded without binding.

Distal deck section 34 is substantially rectangular and includes a substantially linear proximal edge 82 and a spaced apart and substantially parallel and linear distal edge 84, as shown in FIG. 2. Proximal edge 82 and distal edge 84 are substantially parallel to one another and to distal edge 60 of center deck section 32. Distal deck section 34 also includes a substantially linear first side edge 85 and a spaced apart and substantially parallel and linear second side edge 86. First side edge 85 and second side edge 86 extend substantially perpendicularly between proximal edge 82 and distal edge 84.

Distal deck section 34 is pivotally coupled to center deck section 32 by use of a hinge 92, as shown in FIGS. 2 and 3. Hinge 92 in the preferred embodiment is a double pivot hinge with a link extending between pivots on the center and distal deck sections 32, 34. While a double pivot hinge is used, it is possible to use a single pivot hinge similar to hinge 76. If a single pivot hinge is used, the axis of rotation created by the hinges would be located above the floors 66, 88 of the center and distal deck sections 32, 34. Hinge 92 is adapted to allow distal deck section 34 to be folded onto floor 66 of center deck section 32, as shown in FIG. 3. Distal deck section 34 is generally parallel with center deck section 32 when folded onto center deck section 32. Biasing member(s) 96 is adapted to assist a user in folding distal deck section 34 onto center deck section 32. Hinge 92 has an axis of rotation radius that is less than the axis of rotation radius of hinge 76. The axis of rotation radius is the radius measured from the axis of rotation of the hinge to the bottom surface of the load platform 14 when the load platform 14 is in the extended-operational position. The larger axis of rotation of hinge 76 is to allow for all three deck sections 30, 32, 34 to be stacked on each other when in the folded position.

Distal deck section 34 includes a substantially planar floor 88 having a substantially planar top surface mounted on a base. Floor 88 may extend in a substantially planar manner between proximal edge 82 and distal edge 84 and between first side edge 85 and second side edge 86. Alternatively, the distal end of floor 88 may include an integrally formed downwardly extending ramp 90 at distal edge 84 as shown in FIGS. 1-2. Ramp 90 provides a transition surface to allow cargo to be moved from distal deck section 34 to the ground or other surface. Alternatively, a separate ramp may be pivotally coupled to distal edge 84 of distal deck section 34 to allow for a load to be moved on and off of the distal deck section 34 from the ground.

Distal deck section 34 includes a substantially planar proximal end wall 98 that extends downwardly from and substantially perpendicular to floor 88 at proximal edge 82, as shown in FIG. 3. Proximal end wall 98 of distal deck section 34 is adapted to be substantially parallel to and in abutting engagement with distal end wall 72 of center deck section 32 when center deck section 32 and distal deck section 34 are in the extended-operational position. Engagement of end wall 98 with end wall 72 allows load forces from distal deck section 34 to be transferred to center deck section 32. This arrangement allows the distal deck section 34 to be cantilevered from the center deck section 32 without the need for any external support structure or other support structure. This arrangement allows load forces from the distal deck section 34 to be supported by the center deck section 32. Floor 88 of distal deck section 34 has a surface area that is about the same size as the surface area of floor 66 of center deck section 32 but could be dimensionally smaller in depth compared to the other deck sections.

A mount assembly 100 is arranged to mount the liftgate 10 to the frame 13 of the vehicle 12, as shown in FIGS. 1-3. Mount assembly 100 includes a mounting tube or bar 102 and mounting plates 104 that are coupled to the mounting tube 102. Mounting plates 104 are used to secure mounting tube 102 to the frame 13 of the vehicle 12, as shown, for example, in FIG. 7. Mount assembly 100 includes brackets 106 that allow actuators 26, 28 to be pivotally coupled to mounting tube 102, as shown in FIG. 1. Brackets 106 include pivots 107 and hook members 109. Hook members 109 are adapted to be positioned in slots 101, which are formed in support plates 103. Pivots 107 and hook members 109 allow load platform 14 to be leveled with the ground when in the lowest position. Hook members 109 are allowed to slide toward the vehicle 12 within slots 101 when the platform 14 is in the lowest position so that the outermost edge of the platform 14 can contact the ground surface. As platform 14 is raised, hooks slide forward in slots 101 and engage with plates 103 to allow actuators 26, 28 to lift load platform 14. Actuators 26, 28 are preferably hydraulic cylinders that retract and expand by use of a pump, hoses and a controller.

Mount assembly 100 also includes brackets 108 that allow for pivotal connection of outer control arms 50 to mounting tube 102, as shown in FIG. 15. Inner control arms 48 are pivotally coupled to brackets 106 at a first end and to pivot link members 54 at pivot 119 at a second end 121. Mount assembly 100 also includes roller support 110 that engages with an under surface of the center deck section 32 when the load platform 14 is being rotated to the retracted-stored position to assist with positioning of the load platform 14.

Load platform 14 is selectively moveable in the extended-operational position by lift mechanism 22 between a lowered position as shown in FIGS. 1 and 11, wherein load platform 14 is located at a height below the height of cargo floor 16 of vehicle 12, and a raised position wherein the top surface of load platform 14 is located substantially coplanar with the top surface of cargo floor 16 of vehicle 12 for movement of cargo between load platform 14 and cargo floor 16, as shown in FIGS. 2 and 12. Load platform 14 is also selectively moveable or foldable between the extended-operational position as shown in FIGS. 2 and 12 and a retracted-stored position as shown in FIGS. 6 and 7.

Load platform 14 is also selectively moveable in the retracted-stored position by lift mechanism 22 between a lowered position and a raised position. When load platform 14 is in the extended-operational position as shown in FIG. 2, proximal deck section 30, center deck section 32 and distal deck section 34 are located in extended positions substantially horizontal and coplanar with one another, and such that the top surfaces of floors 44, 66, and 88 are substantially horizontal and coplanar with one another.

When load platform 14 is in the extended-operational position, distal deck section 34 extends outwardly from distal edge 60 of center deck section 32 for supporting cargo without external support such as a loading dock or ground surface. In the illustrative embodiment, distal deck section 34 is cantilevered relative to center deck section 32 with proximal end wall 98 of distal deck section 34 being in abutting engagement with distal end wall 72 of center deck section 32, such that distal deck section 34 is self-supporting without any other external support. As platform 14 is folded, center deck section 32 is the topmost deck section, as shown in FIG. 4 but is then rotated 180 degrees so that proximal deck section 30 is the topmost deck section with the distal deck section 34 in between the proximal and center deck sections 30, 32 in both positions.

When it is desired to retract load platform 14 from the extended-operational position, as shown in FIGS. 1 and 2, to the retracted-stored position, distal deck section 34 is manually folded or pivoted about hinge 92 with respect to center deck section 32 until distal deck section 34 overlies center deck section 32, as shown in FIG. 3, with floor 88 being substantially parallel to and facing in close proximity to floor 66. Floor 88 can be in engagement with floor 66. Biasing member(s) 96 provides a resilient biasing force toward a perpendicular orientation between the center and distal deck sections 32, 34 about hinge 92 to assist in the pivoting movement of distal deck section 34 about hinge 92 in both directions.

When distal deck section 34 is folded over onto center deck section 32, as shown in FIG. 3, center deck section 32 is then lifted and rotated about axis of rotation 78 so that distal deck section 34 lies on proximal deck section 30, as shown in FIG. 4. Biasing member(s) 94 assists with folding of both center and distal deck sections 32, 34 onto proximal deck section 30. Biasing member 94 needs to have enough biasing force to compensate for the weight of deck sections 32, 34. Both the center and distal deck sections 32, 34 are rotated in the same direction upon folding and unfolding.

Figure 5:
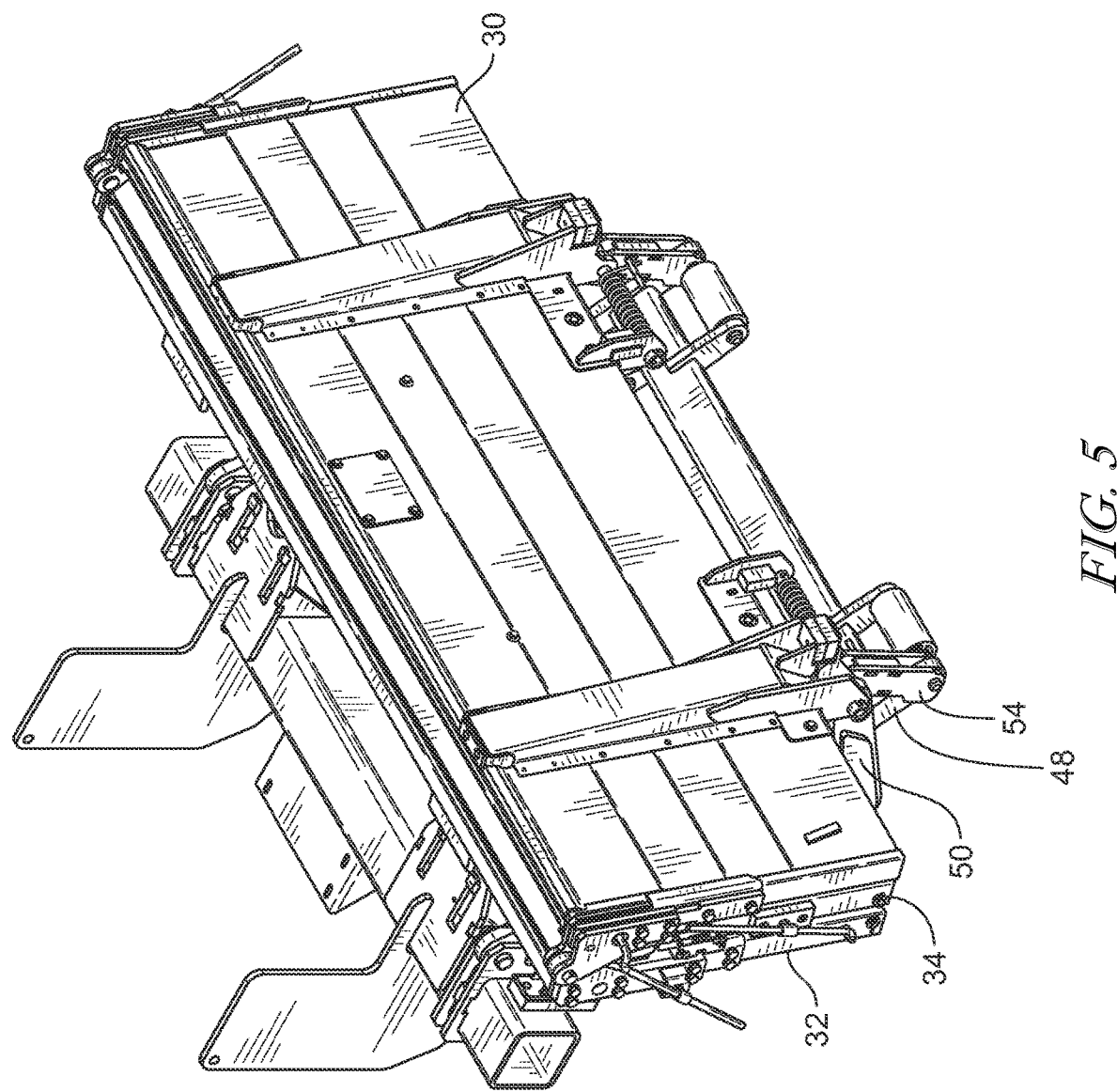
FIG. 5 is an upper perspective view of the liftgate of FIG. 4 shown with the folded load platform pivoted upward to a position that is more vertical than horizontal.

Once the deck sections 30, 32, 34 are folded, deck sections are again together rotated, with the assistance of springs 59 until the center deck section 32 engages roller support 110, as shown in FIGS. 5 and 8. Once center deck section 32 engages roller support 110, the operator operates actuators 26, 28 to cause deck sections to rotate to the retracted-stored position, as shown in FIGS. 6 and 7. In the retracted-stored position, all three deck sections 30, 32, 34 are positioned beneath the cargo floor 16 of the vehicle 12.

When it is desired to extend load platform 14 from the retracted-stored position, as shown in FIGS. 6 and 7, to the extended-operational position, as shown in FIG. 11, deck sections 30, 32, 34 are pivoted by use of actuators 26, 28 and control arms 48, 50, as viewed in FIGS. 7 and 8, such that deck sections 30, 32, 34 pivot until they are generally vertical, as shown in FIG. 8. The operator then manually rotates deck sections 30, 32, 34 to a horizontal orientation, as shown in FIG. 9 with deck sections 30, 32, 34 stacked on top of each other.

Once deck sections 30, 32, 34 are in a horizontal stacked orientation, a user can then manually rotate center and distal deck sections 32, 34 together about hinge 76 to the configuration shown in FIG. 10. Distal deck section 34 is then manually pivoted about hinge 92 with respect to center deck section 32. Biasing member 96 provides a resilient biasing force to distal deck section 34 to assist in the manual pivoting of distal deck section 34 from the retracted folded-over position toward the extended-operational position, as shown in FIG. 11, wherein distal deck section 34 is substantially horizontal and floor 88 of distal deck section 34 is substantially co-planar with floors 44 and 66 of proximal deck section 30 and center deck section 32.

In some embodiments, the depth distance of proximal deck section 30, center deck section 32 and distal deck section 34, between their distal edges and proximal edges, may all be approximately equal to one another. In some embodiments, the depth distance of each deck section between their proximal edge and distal edge may be, for example, 30 inches, 36 inches or 42 inches. In some embodiments, the depth of distal deck section 34 is less than the depth of center deck section 32.

In the illustrative embodiment, proximal deck section 30, center deck section 32, and distal deck section 34 together form a load-bearing surface (or load area) of load platform 14. Proximal deck section 30, center deck section 32, and distal deck section 34 each have substantially similar load-bearing capabilities such that a load (e.g., cargo from vehicle 12) can be moved along load platform 14 and be supported while load platform 14 is in a raised position away from other supporting surfaces (e.g., the ground or a loading dock). For example, a load can be supported on any of proximal deck section 30, center deck section 32, or distal deck section 34, or the load can be supported across multiple of proximal deck section 30, center deck section 32, and distal deck section 34.

In illustrative embodiments, load platform 14 can define an overall load area width of about 80 inches and an overall load area depth of about 84 inches. For example, the proximal and center deck sections 30, 32 can each be about 30 inches deep, and the distal deck section 34 can be 24 inches deep (excluding ramp/transition surface). In some embodiments, load platform 14 can support a "water level load" (i.e., evenly distributed across the entire load area) of about 5500 pounds or more with the load platform 14 spaced apart from supporting surfaces, such as the ground or loading dock.

In some embodiments, load platform 14 can support loads of varying maximum weight depending on a center of mass for the load. For example, in some embodiments, load platform 14 can support about 5500 pounds or more with the center of mass for the load located about 42 inches from the proximal edge 36 of proximal deck section 30. In some embodiments, load platform 14 can support about 4800 pounds or more with the center of mass for the load located about 48 inches from the proximal edge 36 of proximal deck section 30.

In some embodiments, load platform 14 can support about 4300 pounds or more with the center of mass for the load located about 54 inches from the proximal edge 36 of proximal deck section 30. In some embodiments, load platform 14 can support about 3800 pounds or more with the center of mass for the load located about 60 inches from proximal edge 36 of proximal deck section 30. In some embodiments, load platform 14 can support about 3500 pounds or more with the center of mass for the load located about 66 inches from the proximal edge 36 of proximal deck section 30.

In some embodiments, load platform 14 can support about 3200 pounds or more with the center of mass for the load located about 72 inches from the proximal edge 36 of proximal deck section 30. Critically, the relative load support capacity of the load platform 14 at a center of the distal deck section 34 compared to a center of the load platform 14 is at least 0.5 (50 percent) or greater. For example, in the illustrative embodiment, the relative load support capacity at the center of the distal deck section 34 (e.g., 3200 pounds at 72 inches) compared to the load support capacity at the center of the load platform 14 (e.g., 5500 pounds at 42 inches) is about 0.58 (58 percent).

Other load platforms are about 60 inches deep having two substantially even depth deck sections of about 30 inches a piece. In some embodiments, load platform 14 with three deck sections 30, 32, 34 can have a depth of about 90 inches with each deck section 30, 32, 34 being about 30 inches deep, representing a 50 percent increase in depth over other load platforms of similar load capacity. Still other load platforms are about 72 inches deep having two substantially even depth deck sections of about 36 inches a piece.

In some embodiments, load platform 14 with three deck sections 30, 32, 34 can have a depth of about 102 inches with deck section 30, 32 being about 36 inches deep and deck section 34 being about 30 inches deep, representing a 40 percent increase in depth over other load platforms of similar load capacity. Still other load platforms are about 84 inches deep having two substantially even depth deck sections of about 42 inches a piece. In some embodiments, load platform 14 with three deck sections 30, 32, 34 can have a depth of about 114 inches with deck section 30, 32 being about 42 inches deep and deck section 34 being about 30 inches deep, representing a 35 percent increase in depth over other load platforms of similar load capacity.

The liftgate 10 is configured for use with a vehicle, such as a truck with a bed for holding cargo. The liftgate 10 includes a lift mechanism 22 coupled to the vehicle 12 and a moveable load platform 14 coupled to the lift mechanism 22 for movement between a lowered position and a raised position. The load platform 14 includes a proximal deck section 30 coupled to the lift mechanism 22, a distal deck section 34, and a center deck section 32 positioned between the proximal deck section 30 and the distal deck section 34.

The proximal deck section 30, center deck section 32, and distal deck section 34 are pivotally coupled to one another such that the load platform 14 is selectively moveable between an extended-operational position where the proximal, center, and distal deck sections 30, 32, 34 are located substantially coplanar with one another for supporting a load and a retracted-stored position where the proximal, center, and distal deck sections 30, 32, 34 are folded with respect to one another and are located substantially parallel and adjacent to one another with the distal deck section positioned between the proximal and center deck sections 30, 32, 34 are folded. The distal deck section 34 is configured to extend away from the center deck section 32 in the extended-operational position and is configured to be supported by the center deck section 32 to allow the center deck section 32 to support a load thereon while the load platform in the raised position. When the deck sections are in the retracted-stored position they are located beneath the vehicle and specifically below the cargo floor 16 of the vehicle. When the deck sections 30, 32, 34 are folded together so that they are in a first folded position, as shown in FIG. 4, the center deck section 32 is the topmost deck section. When the deck sections 30, 32, 34 are rotated together into a second folded position, as shown in FIG. 6, the proximal deck section is the top most deck section. When folding the distal and center deck sections 34, 32, both the center and distal deck sections are rotated in the same direction upon folding.

The lift mechanism 22 includes an outer control arm 50 having a first leg 122 and a second leg 124 that is shorter than the first leg 122, as shown in FIG. 13. The first leg 122 having a length approximately equal to the depth of one of the deck sections, 30, 32, 34, as shown in FIG. 7. The second leg 124 has a length that is approximately equal to the combined thickness of the proximal, center, and distal deck sections 30, 32, 34. The proximal and center deck sections 30, 32 are pivotally coupled by a first hinge 76 and the first hinge 76 has an axis of rotation radius that is approximately one half the thickness of the proximal, center, and distal deck sections 30, 32, 34 when folded together. Further, the distal deck section 34 is pivotally coupled to the center deck section 32 by a second hinge 92 and the second hinge 92 has an axis of rotation radius that is less than the axis of rotation radius of the first hinge 76.

The distal deck section 34 of load platform 14 is cantilevered from the center deck section 32 with the proximal, center, and distal deck sections 30, 32, 34 in the extended-operational position and the load platform in the raised position. Each of the proximal, center, and distal deck sections 30, 32, 34 each define a portion of an upper load-support surface of the load platform when the load platform is in the extended-operational position. Each portion of the load-support surface, defined by the proximal, center, and distal deck sections 30, 32, 34, is configured to support the load in the raised position. The load platform is configured to provide a first load carrying capacity with a center of mass of the load arranged at a center of the load platform, wherein the load platform is configured to provide a second load carrying capacity with a center of mass of the load arranged at a center of the distal deck section, and wherein the second load carrying capacity is at least 25 percent of the first load carrying capacity.

The load platform 14 is designed to provide a large surface area to provide support for large objects, such as hot tubs and couches, for example. The load platform 14 not only needs to support a large dimensional load but it must be able to fold and store beneath the cargo floor 16 of the vehicle 12. The present disclosure allows for a platform depth (D) to vehicle bed height (H) ratio from about 1.55 to about 2.0, as shown in FIG. 11. For example, the vehicle bed height is typically between 44 inches and 55 inches depending upon the load in the vehicle. Thus, for a 1.55 platform depth to vehicle bed height ratio, the platform can have a depth of 68.2 inches to about 85.25 inches and still properly stow beneath the vehicle 12. In another example, for a 2.0 platform depth to vehicle bed height ratio, the platform can have a depth of 88 inches to about 110 inches and still properly stow beneath the vehicle 12. Alternatively, the load platform to bed height ratio can be from about 1.60 to about 1.95. In another embodiment, the platform depth to bed height ratio can be from about 1.65 to about 1.90. In another example, for a vehicle bed height of 36 inches the load platform 14 can have a depth of about 54 inches for a load platform to bed height ratio of 1.5. The liftgate of the present disclosure provides the largest platform to bed height ratio where the load platform 14 can be folded and positioned beneath the cargo floor 16 of the vehicle 12. While a target inertia ratio of about 1.9 has been identified as the optimum balance enabling the load platform 14 to handle a dimensionally larger load while at the same time providing exceptional maneuverability to allow for storage beneath the bed of the vehicle 12.

The liftgate 10 includes a first biasing member 94, in the form of a torsion spring, that is configured to assist in folding the center and distal deck sections 32, 34 onto the proximal deck section 30. Liftgate 10 further includes a second biasing member 96 that is configured to assist in folding the distal deck section 34 onto the center deck section 32. The first biasing member 94 has a biasing force that is greater than the biasing force of the second biasing member 96.

The embodiment(s) detailed hereinabove may be combined in full or in part, with any alternative embodiment(s) described. A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the present disclosure describes various exemplary embodiments, the disclosure is not so limited. To the contrary, the disclosure is intended to cover various modifications, uses, adaptations, and equivalent arrangements based on the principles disclosed. Further, this disclosure is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims.

The invention claimed is:

1. A liftgate for use with a vehicle having a bed elevated above a ground surface having a bed height, the liftgate comprising:

a lift mechanism coupled to the vehicle;
a moveable load platform coupled to the lift mechanism for movement between a lowered position and a raised position, the load platform having a depth and including:
a proximal deck section located proximate the lift mechanism;
a distal deck section; and
a center deck section positioned between the proximal deck section and the distal deck section; wherein the proximal deck section, center deck section, and distal deck section are pivotally coupled to one another about first and second axes of rotation such that the load platform is selectively moveable between an extended-operational position where the proximal, center, and distal deck sections are located generally coplanar with one another for supporting a load and a retracted-stored position where the proximal, center, and distal deck sections are folded with respect to one another and are located generally parallel and adjacent to one another;
wherein the proximal, center, and distal deck sections, when folded, can be rotated together about a third axis of rotation, that is separate from the first and second axes of rotation to stow the deck sections underneath the bed of the vehicle; and
wherein the distal deck section extends away from the center deck section in the extended-operational position and is configured to be supported by the center deck section without any other external support to allow the distal deck section to support a load thereon while the load platform is in the raised position.

2. The liftgate of claim 1, wherein, in a first configuration, the deck sections are folded together such that one of the proximal, center, or distal deck sections is the topmost deck section, and wherein, in a second configuration, the deck sections are rotated together relative to the lift mechanism such that one of the other of the proximal, center, and distal deck sections is the topmost deck section.

3. The liftgate of claim 1, wherein both the center and distal deck sections are rotated in the same direction relative to the proximal deck section upon folding.

4. The liftgate of claim 1, wherein the proximal deck section is pivotally coupled to a control arm of the lift mechanism, wherein the control arm has a first leg and a second leg that is shorter than the first leg, and wherein the first leg has a length approximately equal to a depth of at least one of the deck sections.

5. The liftgate of claim 4, wherein the second leg has a length that is approximately equal to a combined thickness of the proximal, center, and distal deck sections.

6. The liftgate of claim 1, wherein the proximal and center deck sections are pivotally coupled by a first hinge, and wherein the first hinge has an axis of rotation radius that is approximately one half of a combined thickness of the proximal, center, and distal deck sections when folded together.

7. The liftgate of claim 6, wherein distal deck section is pivotally coupled to the center deck section by a second hinge, and wherein the second hinge has an axis of rotation radius that is less than the axis of rotation radius of the first hinge.

8. The liftgate of claim 1, wherein the distal deck section is cantilevered from the center deck section with the proximal, center, and distal deck sections in the extended-operational position and the load platform in the raised position.

9. The liftgate of claim 1, wherein the proximal, center, and distal deck sections each define a portion of an upper load-support surface of the load platform when the load platform is in the extended-operational position, and wherein each portion of the load-support surface defined by the proximal, center, and distal deck sections is configured to support the load in the raised position.

10. The liftgate of claim 9, wherein the load platform is configured to provide a first load carrying capacity with a center of mass of the load arranged at a center of the load platform, wherein the load platform is configured to provide a second load carrying capacity with a center of mass of the load arranged at a center of the distal deck section, and wherein the second load carrying capacity is at least 25 percent of the first load carrying capacity.

11. The liftgate of claim 1, wherein the liftgate has a platform depth to bed height ratio of at least 1.50.

12. The liftgate of claim 1, wherein the liftgate has a platform depth to bed height ratio of at least 1.55.

13. The liftgate of claim 1, wherein the liftgate has a platform depth to bed height ratio of at least 1.70.

14. The liftgate of claim 1, wherein the liftgate has a platform depth to bed height ratio from about 1.60 to about 1.95.

15. The liftgate of claim 1, wherein the liftgate has a platform depth to bed height ratio from about 1.65 to about 1.90.

16. The liftgate of claim 1, further comprising a first biasing member configured to bias the center and distal deck sections relative to the primary deck section to assist a user in folding the center and distal deck sections relative to the primary deck section between folded and unfolded positions.

17. The liftgate of claim 16, further comprising a second biasing member configured to bias the distal deck section relative to the center deck section to assist a user in folding the distal deck section relative to the center deck section between folded and unfolded positions, wherein the first biasing member has a biasing force that is greater than a biasing force of the second biasing member.

18. A liftgate for use with a vehicle having a bed elevated above a ground surface having a bed height, the liftgate comprising:
a lift mechanism coupled to the vehicle; a moveable load platform coupled to the lift mechanism for movement between a lowered position and a raised position, the load platform having a depth and including:
a proximal deck section located proximate the lift mechanism;
a distal deck section; and
a center deck section positioned between the proximal deck section and the distal deck section;
wherein the proximal deck section, center deck section, and distal deck section are pivotally coupled to one another such that the load platform is selectively moveable between an extended-operational position where the proximal, center, and distal deck sections are located generally coplanar with one another for supporting a load and a retracted-stored position where the proximal, center, and distal deck sections are folded with respect to one another about first and second axes of rotation and are located generally parallel and adjacent to one another;
wherein the proximal, center, and distal deck sections, when folded, can be rotated together about a third axis of rotation, that is separate from the first and second axes of rotation to stow the deck sections underneath the bed of the vehicle;

wherein the distal deck section extends away from the center deck section in the extended-operational position and is configured to be supported by the center deck section without any other external support to allow the distal deck section to support a load thereon while the load platform is in the raised position; and wherein the liftgate has a platform depth to bed height ratio of at least 1.55.

19. A liftgate for use with a vehicle having a bed elevated above a ground surface having a bed height, the liftgate comprising:

a lift mechanism coupled to the vehicle;

a moveable load platform coupled to the lift mechanism for movement between a lowered position and a raised position, the load platform having a depth and including:

a proximal deck section located proximate the lift mechanism;

a distal deck section; and a center deck section positioned between the proximal deck section and the distal deck section; wherein the proximal deck section, center deck section, and distal deck section are pivotally coupled to one another about first and second axes of rotation such that the load platform is selectively moveable between an extended-operational position where the proximal, center, and distal deck sections are located generally coplanar with one another for supporting a load and a retracted-stored position where the proximal, center, and distal deck sections are folded with respect to one another and are located generally parallel and adjacent to one another;

wherein the proximal, center, and distal deck sections, when folded, can be rotated together about a third axis of rotation, that is separate from the first and second axes of rotation to stow the deck sections underneath the bed of the vehicle;

wherein the distal deck section extends away from the center deck section in the extended-operational position and is configured to be supported by the center deck section without any other external support to allow the distal deck section to support a load thereon while the load platform is in the raised position; and wherein the platform includes at least one biasing member to assist a user in either folding the distal deck section onto the center deck section or the center and distal deck sections onto the proximal deck section.

* * * * *